United States Patent
Imada (10) Patent No.: US 11,029,561 B2
(45) Date of Patent: Jun. 8, 2021

(54) LIGHT EMITTING MODULE AND PLANAR LIGHT SOURCE

(71) Applicant: NICHIA CORPORATION, Anan (JP)

(72) Inventor: Mamoru Imada, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/911,264

(22) Filed: Jun. 24, 2020

(65) Prior Publication Data

US 2020/0409216 A1    Dec. 31, 2020

(30) Foreign Application Priority Data

Jun. 28, 2019 (JP) .............................. JP2019-121248

(51) Int. Cl.
| | | |
|---|---|---|
| *G02F 1/13357* | (2006.01) | |
| *F21V 8/00* | (2006.01) | |

(52) U.S. Cl.
CPC ..... *G02F 1/133603* (2013.01); *G02B 6/0025* (2013.01); *G02B 6/0031* (2013.01); *G02F 1/133606* (2013.01)

(58) Field of Classification Search
CPC ......... G02F 1/133603; G02F 1/133606; G02B 6/0025; G02B 6/0031; G02B 6/002; G02B 6/0033; G02B 6/0045; G02B 6/0046; H01L 23/02; H01L 23/04; H01L 23/10; H01L 23/18; H01L 23/29; H01L 23/28; H01L 23/31; H01L 23/3107; F21V 5/10; F21V 5/04
See application file for complete search history.

(56) References Cited

U.S. PATENT DOCUMENTS

| | | | | |
|---|---|---|---|---|
| 7,488,089 | B2 * | 2/2009 | Park ..................... | G02B 3/0037 362/237 |
| 7,972,029 | B2 * | 7/2011 | Pruss .................... | F21V 7/0091 362/245 |
| 2005/0265029 | A1 | 12/2005 | Epstein et al. | |
| 2006/0092644 | A1 * | 5/2006 | Mok ....................... | H01L 33/60 362/327 |
| 2006/0238873 | A1 | 10/2006 | Park et al. | |

(Continued)

FOREIGN PATENT DOCUMENTS

| | | |
|---|---|---|
| JP | 2006302863 A | 11/2006 |
| JP | 2009063684 A | 3/2009 |

(Continued)

*Primary Examiner* — Bao Q Truong
(74) *Attorney, Agent, or Firm* — Hunton Andrews Kurth LLP (57) ABSTRACT

An upper face of a light guide includes a projected portion that has a planar face, and a wall portion that surrounds the projected portion, wherein a top part of the wall portion is positioned higher than the planar face. A lower face of the light guide has a recessed portion. A light transmitting part that has a lower refractive index than a reflective index of the light guide is disposed on the projected portion in an area surrounded by the wall portion. A light source is disposed in the recessed portion. The projected portion has an oblique face which is oblique to the planar face and disposed between the planar face and the wall portion. In a plan view of the planar face of the projected portion, the oblique face of the projected portion is positioned outward of a lateral face of the recessed portion at least in part.

9 Claims, 6 Drawing Sheets (56) References Cited

U.S. PATENT DOCUMENTS

| | | |
|---|---|---|
| 2009/0059125 A1 | 3/2009 | Nagayoshi et al. |
| 2009/0086508 A1 | 4/2009 | Bierhuizen |
| 2014/0061699 A1 | 3/2014 | Kim |
| 2019/0227382 A1 | 7/2019 | Watanabe et al. |
| 2020/0049877 A1 | 2/2020 | Watanabe et al. |

FOREIGN PATENT DOCUMENTS

| | | |
|---|---|---|
| JP | 2010541154 A | 12/2010 |
| JP | 2011165590 A | 8/2011 |
| JP | 2013101901 A | 5/2013 |
| JP | 2014022126 A | 2/2014 |
| JP | 2014049440 A | 3/2014 |
| JP | 2015118818 A | 6/2015 |
| JP | 2018101521 A | 6/2018 |
| JP | 2018106826 A | 7/2018 |
| KR | 20090117419 A | 11/2009 |

\* cited by examiner

LIGHT EMITTING MODULE AND PLANAR LIGHT SOURCE

CROSS-REFERENCE TO RELATED APPLICATION

This application claims priority to Japanese Patent Application No. 2019-121248, filed on Jun. 28, 2019, the disclosure of which is hereby incorporated by reference in its entirety.

BACKGROUND

The present disclosure relates to a light emitting module and a planar light source.

Light emitting modules employing light emitting elements such as light emitting diodes are widely utilized as planar light sources, for example, backlights for liquid crystal displays. There is an increasing demand for thinner planar light sources for, for example, direct-lit liquid crystal displays in which planar light sources are mounted on the rear surfaces of the liquid crystal panels. In the case in which the distance between the light source and the emission face of a light guide plate decreases as the planar light source becomes thinner, light is not sufficiently diffused whereby luminance non-uniformity is readily occur in the emission face. See, for example, Japanese Patent Publication No. 2018-106826.

SUMMARY

One of the objects of the present disclosure is to provide a light emitting module and a planar light source having less luminance non-uniformity in the emission face.

A light emitting module according to an embodiment of the present disclosure includes: a light guide, a light transmitting part and a light source. The light guide has an upper face having a projected portion which has a planar face and a wall portion surrounding the projected portion. A top part of the wall portion being positioned higher than the planar face. The light guide has a lower face opposing the upper face. The lower face has a recessed portion. The light transmitting part are formed on the projected portion in an area surrounded by the wall portion, and has a lower refractive index than a reflective index of the light guide. The light source is disposed in the recessed portion. The projected portion has an oblique face oblique to the planar face, and disposed between the planar face and the wall portion. In a plan view of the planar face of the projected portion, the oblique face of the projected portion is positioned outward of a lateral face of the recessed portion at least in part.

According to the present disclosure, a light emitting module and a planar light source having less luminance non-uniformity in the emission face.

DESCRIPTION

Certain embodiments of the present invention will be explained below with reference to the accompanying drawings. In the drawings, the same or substantially the same elements are denoted with the same reference numerals.

Figure 1:
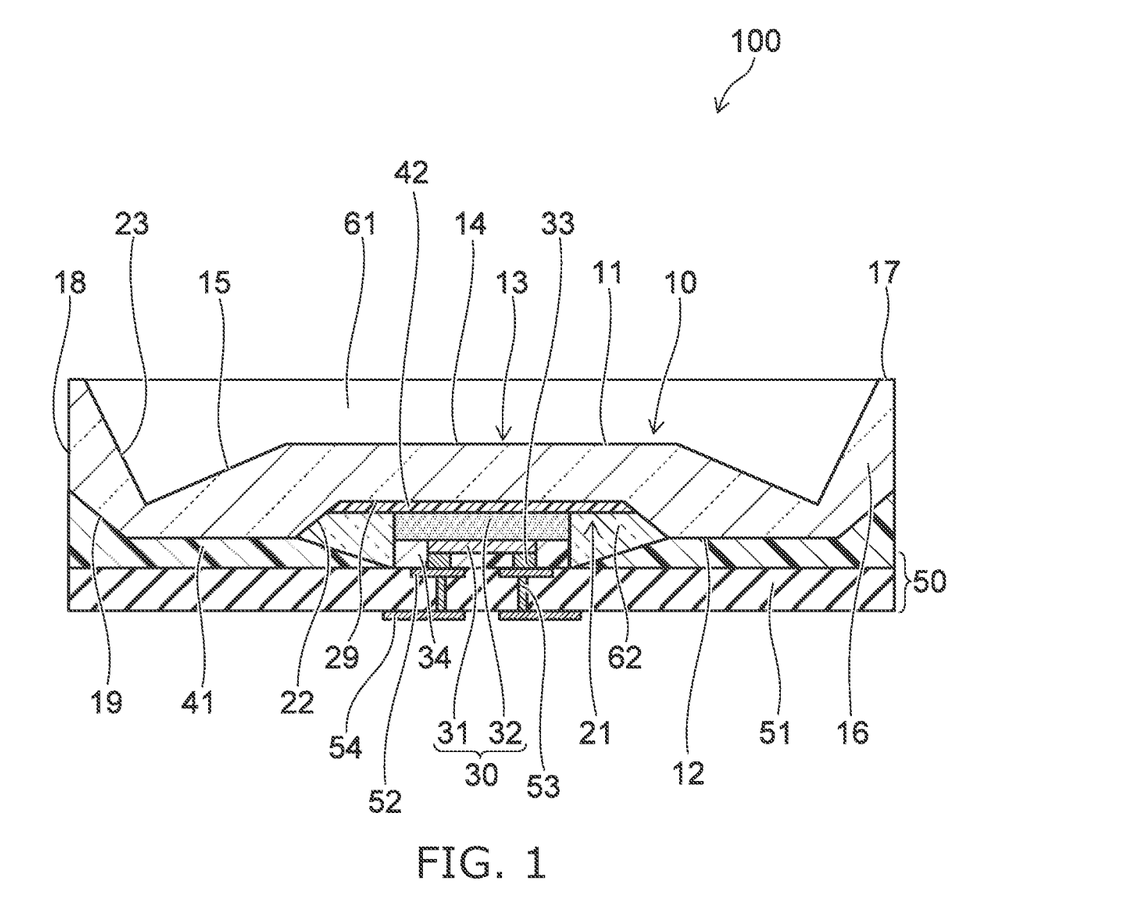
FIG. 1 is a schematic cross-sectional view of a light emitting module according to a certain embodiment of the present invention.
Figure 2:
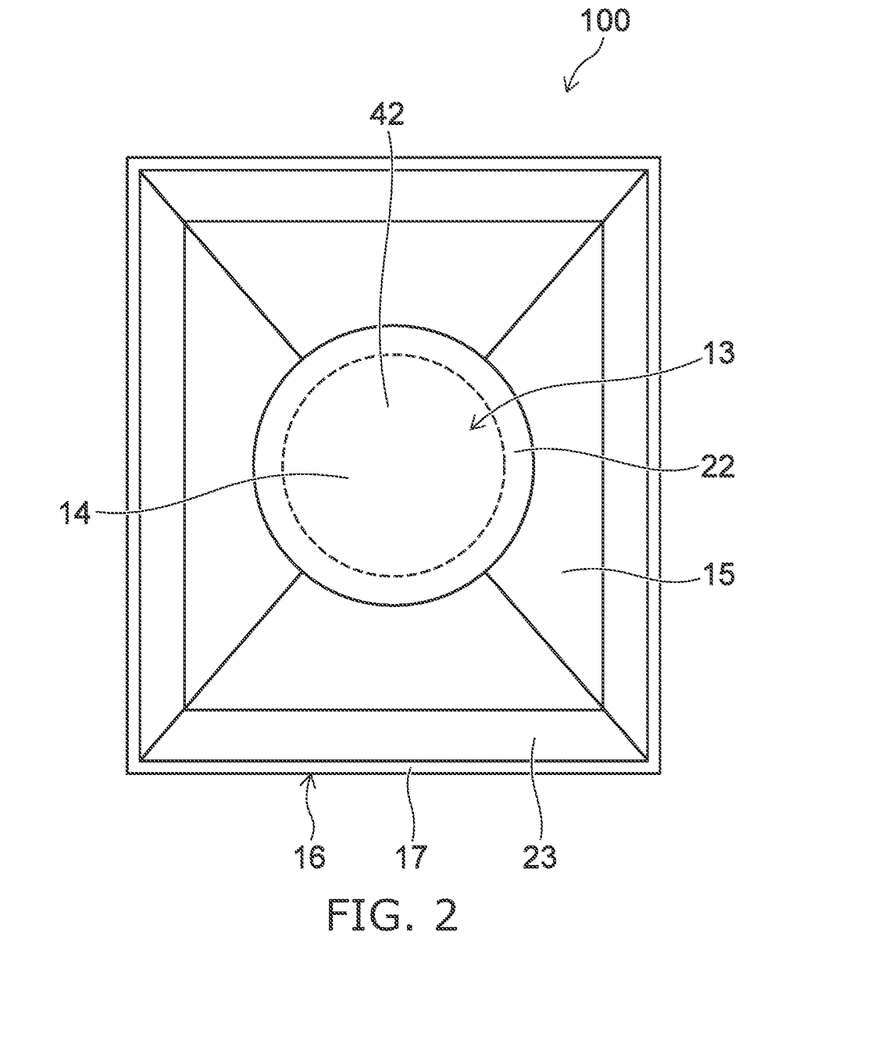
FIG. 2 is a schematic top view of the light emitting module according to the embodiment of the present invention.

FIG. 1 is a schematic cross-sectional view of a light emitting module 100 according to an embodiment. FIG. 2 is a schematic top view of the light emitting module 100.

The light emitting module 100 may comprise a light guide 10, a light source 30, a light transmitting part 61 (a first light transmitting part 61). The light emitting module 100 may further comprise a first light reflecting member 42, and/or a second light reflecting member 41.

The light guide 10 transmits the light emitted by the light source 30. Examples of usable material(s) for the light guide 10 include a thermoplastic resin, such as acrylic, polycarbonate, cyclic polyolefin, polyethylene terephthalate, and polyester, a thermosetting resin, such as epoxy and silicone, and glass. Among such examples, polycarbonate is preferable due to its highly light transmissivity and inexpensiveness.

The light guide 10 has an upper face 11 which serves as the emission face, and a lower face 12 which opposes the upper face 11. The upper face 11 may include a projected portion 13 which has a planar face 14, and a wall portion 16 which surrounds the projected portion 13. The wall portion 16 may have inner lateral faces 23 that surround the projected portion 13, and a top part 17 that is higher than the planar face 14 of the projected portion 13. The inner lateral faces 23 may be oblique to the planar face 14 of the projected portion 13 where the planar face 14 and each inner lateral face 23 may form an obtuse angle. The lower face 12 of the light guide 10 may have a recessed portion 21. The recessed portion 21 defines an opening at the lower face 12 of the light guide 10 and has the bottom face 29 which is located more closely to the planar face 14 of the projected portion 13 than the lower face 12.

The light source 30 may include a light emitting element 31 and a phosphor layer 32. At least the phosphor layer 32 of the light source 30 may be positioned in the recessed portion 21 of the light guide 10. In the example shown in FIG. 1, the light emitting element 31 is also positioned in the recessed portion 21. Alternatively, the light emitting element 31 may be located outside of the recessed portion 21. The phosphor layer 32 may be disposed between the light emitting element 31 and the bottom face 29 of the recessed portion 21.

The primary emission face of the light emitting element 31 may be adhered to the phosphor layer 32. A pair of positive and negative electrodes 33 are formed on the face opposite the primary emission face of the light emitting element 31. The light emitting element 31 may have a semiconductor stack structure. The semiconductor stack structure includes, for example, $In_xAl_yGa_{1-x-y}N$ ($0 \leq x$, $0 \leq y$, $x+y \leq 1$) and can emit blue light. The lateral faces of the light emitting element 31 may be covered with a cover member 34. The cover member 34 is preferably formed with a white resin, thereby allowing the light from the light emitting element 31 to concentrate on the primary emission face side and efficiently enter the phosphor layer 32. The cover member 34 may be also located under the light emitting element 31.

The phosphor layer 32 may contain a base material and phosphor particles dispersed in the base material. Examples of usable base material(s) of the phosphor layer 32 include an epoxy resin, silicone resin, glass, and the like. From the light resistance and formability perspectives, a silicone resin is preferable to be used as the base material.

The phosphor is excited by the light emitted by the light emitting element 31, and emits light having a different wavelength from a wavelength of the light emitted by the light emitting element 31. Examples of usable phosphor include YAG based phosphors, β-SiAlON based phosphors, KSF based phosphors, and the like. The phosphor layer 32 may contain multiple types of phosphors.

A second light transmitting part 62 that transmits the light emitted by the light source 30 may be disposed in the surrounding of the light source 30 in the recessed portion 21. The refractive index of the second light transmitting part 62 may be lower than the refractive index of the light guide 10. The second light transmitting part 62 is formed of, for example, a resin, and the light source 30 may be fixed by the resin in the recessed portion 21. The second light transmitting part 62 may be glass or an air layer.

The light transmitting part 61 may be provided on the projected portion 13 in the area surrounded by the wall portion 16 of the light guide 10. The light transmitting part 61 transmits the light emitted by the light source 30. The refractive index of the light transmitting part 61 may be lower than the refractive index of the light guide 10. The light transmitting part 61 may be formed of, for example, an air layer. Alternatively, the light transmitting part 61 may be a resin having a lower refractive index than the reflective index of the light guide 10.

The projected portion 13 of the light guide 10 may have oblique faces 15 around the planar face 14. The oblique faces 15 that are oblique to the planar face 14 may be positioned between the planar face 14 and the inner lateral faces 23 of the wall portion 16. The planar face 14 and each oblique face 15 may form an obtuse angle. The oblique faces 15 may be downwardly inclined from the planar face 14 towards the lower ends of the inner lateral faces 23 of the wall portion 16.

In a plan view of the planar face 14 of the projected portion 13, FIG. 2, the oblique faces 15 of the projected portion 13 may be located outward of the lateral face 22 of the recessed portion 21 at least in part. This allows the light advancing from the lateral face 22 of the recessed portion 21 through the light guide 10 to enter the oblique faces 15. The lateral face 22 of the recessed portion 21 may be oblique to the planar face 14 of the projected portion 13.

The first light reflecting member 42 may be disposed in the recessed portion 21 between the planar face 14 of the projected portion 13 and the light source 30. The first light reflecting member 42 is formed of, for example, a white resin containing a light scattering agent. The first light reflecting member 42 is formed of, for example, a silicone resin containing titanium oxide. The first light reflecting member 42 downwardly reflects a portion of the light emitted directly upwards from the light source 30. Accordingly, the area in the emission face of the light emitting module 100 directly above the light source 30 and the vicinity area thereof are less likely to become excessively brighter than the remaining area.

Figure 4:
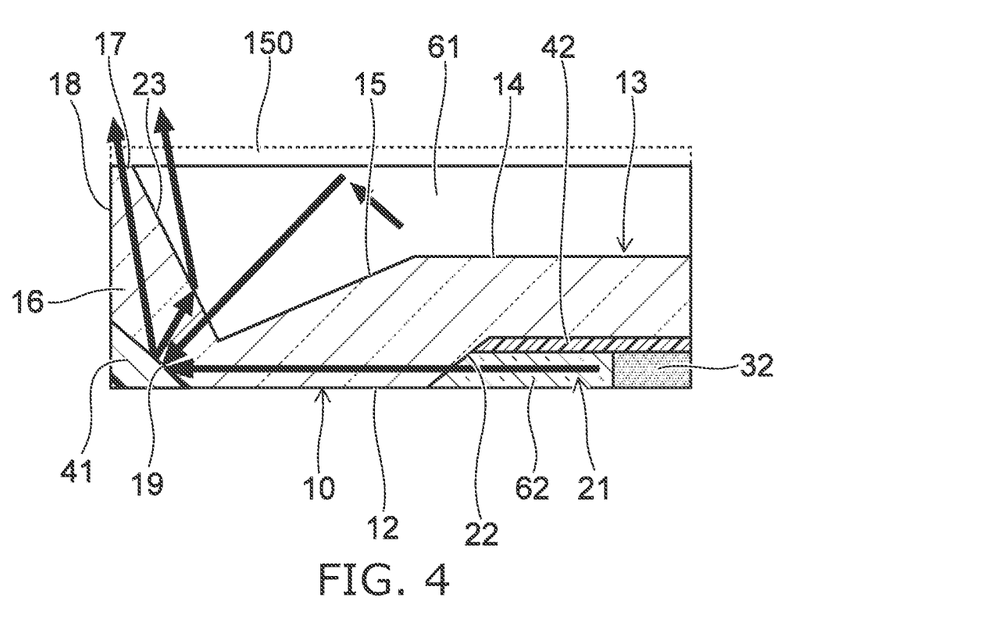
FIG. 4 is a schematic cross-sectional view showing the diffusion of light in the light emitting module according to the embodiment of the present invention.

As indicated by broken lines in FIG. 4, a light diffusion sheet 150 adhered to the top part 17 of the wall portion 16 and covering the wall portion 16 and the light transmitting part 61 may be disposed. A plurality of light diffusion sheets 150 may be disposed. The wall portion 16 functions as a spacer for creating a light transmitting part 61 between the light diffusion sheet 150 and the upper face 11 of the light guide 10.

A second light reflecting member 41 may be disposed on the lower face 12 of the light guide 10. The second light reflecting member 41 is formed of, for example, a white resin containing a light scattering agent. The second light reflecting member 41 is formed of, for example, a silicone resin containing titanium oxide.

The second light reflecting member 41 may partially cover the opening of the recessed portion 21. The electrodes 33 of the light emitting element 31 are connected to wiring 52. The cover member 34, which may be an insulator, may cover the lateral faces of the electrodes 33 of the light emitting element 31.

The light guide 10 may have oblique parts 19 oblique to and continuous with the lower face 12 of the light guide 10 and the outer lateral faces 18 of the wall portion 16. The second light reflecting member 41 may be also disposed on and cover the oblique parts 19.

The second light reflecting member 41 may be bonded to the wiring board 50. The wiring board 50 may include an insulating base 51, wirings 54 disposed on the rear face of the base 51, and vias 53 penetrating the base 51. The vias 53 connect the wiring 52 and the wiring 54, and the electrodes 33 of the light emitting element 31 are electrically connected to the wiring 54 through the wirings 52 and the vias 53.

Examples of materials usable for the base 51 of the wiring board 50 include a resin or ceramic. Examples of materials usable for the wiring 52, 54, and vias 53 include copper.

The light emitting module 100 according to the embodiment can reduce the distance between the light guide 10 and the light source 30 because the light source 30 is mounted on the light guide 10, but not on the wiring board 50. This can reduce the thickness of the light emitting module 100. Such a light emitting module 100 can be used, for example, as a backlight of a liquid crystal display.

In a direct-lit liquid crystal display including a backlight mounted on the rear face of the liquid crystal panel, for example, the distance between the liquid crystal panel and the light emitting module 100 is small, which readily allows the luminance non-uniformity in the light emitting module 100 to adversely affect the luminance uniformity in the liquid crystal display. The light emitting module 100 according to the embodiment, as explained below, can reduce the luminance concentration in the central portion of the emission face where the light source 30 is located to thereby reduce luminance non-uniformity in the emission face. Accordingly, using the light emitting module 100 according to the embodiment as the backlight of a liquid crystal display can reduce luminance non-uniformity of the liquid crystal display.

Figure 3:
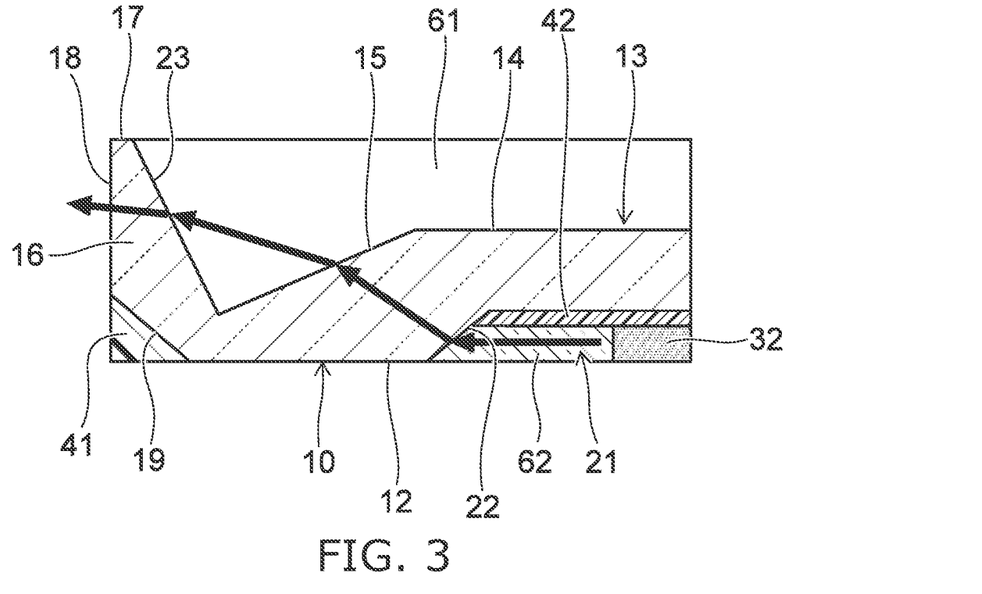
FIG. 3 is a schematic cross-sectional view showing the diffusion of light in the light emitting module according to the embodiment of the present invention.

FIG. 3 and FIG. 4 are schematic cross-sectional views showing diffusion of light in the light emitting module 100. In FIG. 3 and FIG. 4, bold arrows schematically indicate light beams.

Because the upper face of the light source 30 faces the first light reflecting member 42, light primarily exits in a lateral direction from the light source 30. The light exiting in the lateral direction from the light source 30 is refracted at the lateral face 22 of the recessed portion 21 as shown in FIG. 3. Because the refractive index of the second light transmitting part 62 in the recessed portion 21 is lower than the refractive index of the light guide 10, the angle of refraction at the lateral face 22 is smaller than the angle of incidence.

The light refracted at the lateral face 22 and advancing in the light guide 10 is refracted at the oblique faces 15. Because the refractive index of the light guide 10 is higher than the refractive index of the light transmitting part 61, the angle of refraction is larger than the angle of incidence at the oblique faces 15. At the oblique faces 15, the light is refracted towards the inner lateral faces 23 of the wall portion 16.

The light refracted at the oblique faces 15 and advancing in the light transmitting part 61 is refracted at the inner lateral faces 23 of the wall portion 16. Because the refractive index of the light transmitting member 61 is lower than the refractive index of the wall portion 16, the angle of refraction is smaller than the angle of incidence at the inner lateral faces 23. At the inner lateral faces 23, the light is refracted towards the outer lateral faces 18 of the wall portion 16.

As described above, in accordance with the embodiment, the light exiting in the lateral direction from the light source 30 is diffused outward. The projected portion 13 of the light guide 10 functions as a light diffusing lens.

As shown in FIG. 4, the light advancing in the lateral direction from the light source 30 and the light reflected by the light diffusion sheet 150 disposed on the light guide 10 can be reflected by the oblique parts 19 to advance upwards in the outer peripheral area of the light guide 10. In other words, in the structure without oblique parts 19 in which light is reflected by the outer lateral faces 18 orthogonal to the planar face 14, the light tends to advance to the central portion, however, in the structure with the oblique parts 19, the oblique parts 19 are more likely to allow the light to advance to the outer peripheral area compared to the structure without the oblique parts 19.

As explained with reference to FIG. 3 and FIG. 4, in accordance with the embodiment, luminance concentration in the central portion of the emission face can be moderated, and as a result, luminance non-uniformity in the emission face can be reduced.

Figure 5:
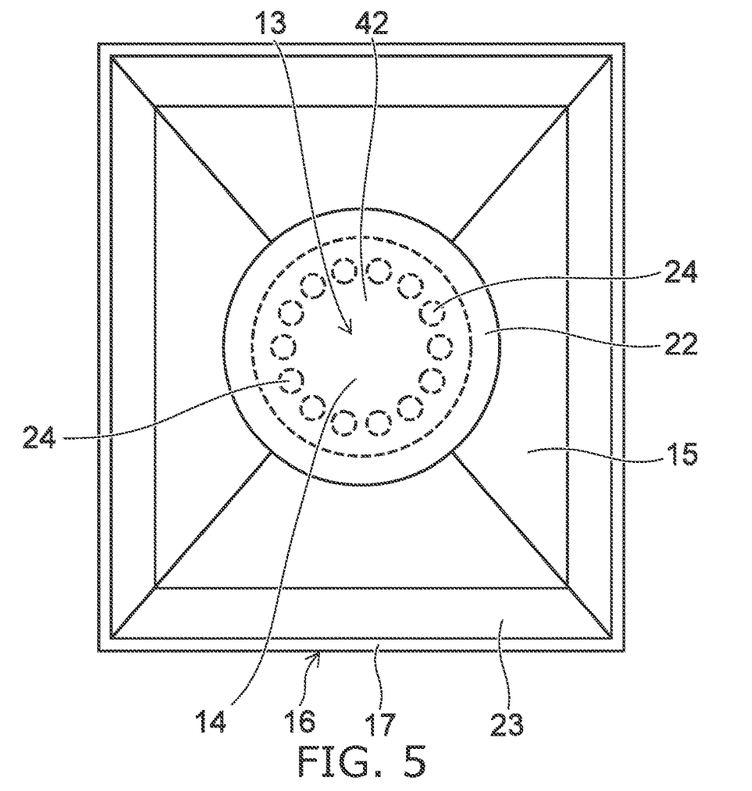
FIG. 5 is a schematic top view of another example of the light emitting module according to the embodiment of the present invention.
Figure 6:
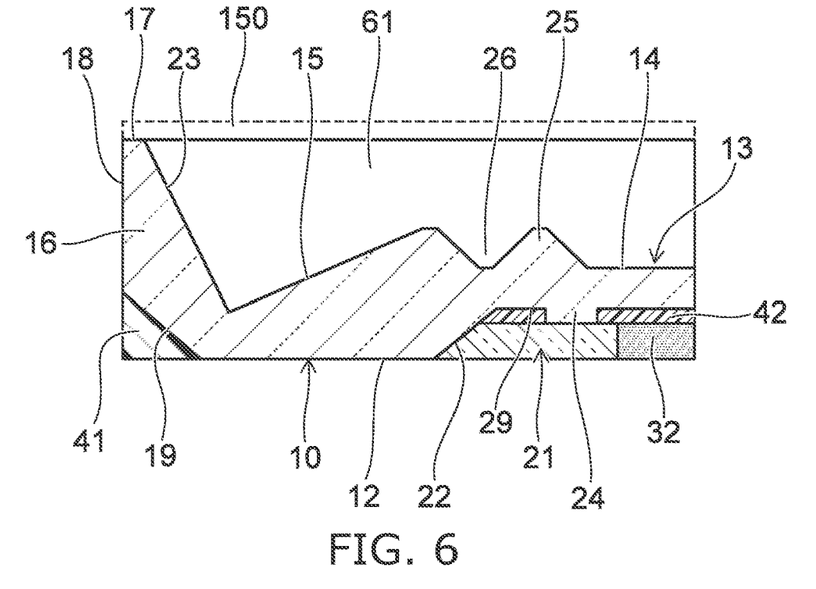
FIG. 6 is a partial schematic cross-sectional view of the light emitting module shown in FIG. 5.

FIG. 5 is a schematic top view of another example of the light emitting module 100. FIG. 6 is a schematic cross-sectional view of the light emitting module shown in FIG. 5.

The light guide 10 may have at least one penetration part 24 projecting from the bottom face 29 of the recessed portion 21, and penetrating the first light reflecting member 42. In a plan view of the planar face 14 of the projected portion 13, FIG. 5, the planar face 14 is circular in shape, for example. The light guide 10 may have a plurality of penetration parts 24. The plurality of penetration parts 24 may be arranged at equal intervals along the outer periphery of the circular planar face 14, for example.

As shown in FIG. 6, a second projected portion 25 and a second recessed portion 26 may be formed between the planar face 14 of the projected portion 13 and the oblique faces 15 of the light guide 10. In the example shown in FIG. 6, the second projected portion 25 is formed between the planar face 14 and the second recessed portion 26, and the second recessed portion 26 is formed between the second projected portion 25 and the oblique faces 15. Alternatively, either one of the second projected portion 25 and the second recessed portion 26 may be provided.

The penetration parts 24 may be arranged in the area outward of the area directly above the light source 30. Accordingly, the penetration parts 24 can guide the light output diagonally upwards from the light source 30 towards the upper face (i.e., emission face) of the light guide 10 while reducing luminance concentration in the area directly above the light source 30.

The second projected part 25 and the second recessed part 26 may be arranged in the area directly above the penetration parts 24, or in the area outward of the area directly above the penetration parts 24. Accordingly, the light entering the light guide 10 through the penetration parts 24 can be diffused.

Figure 7:
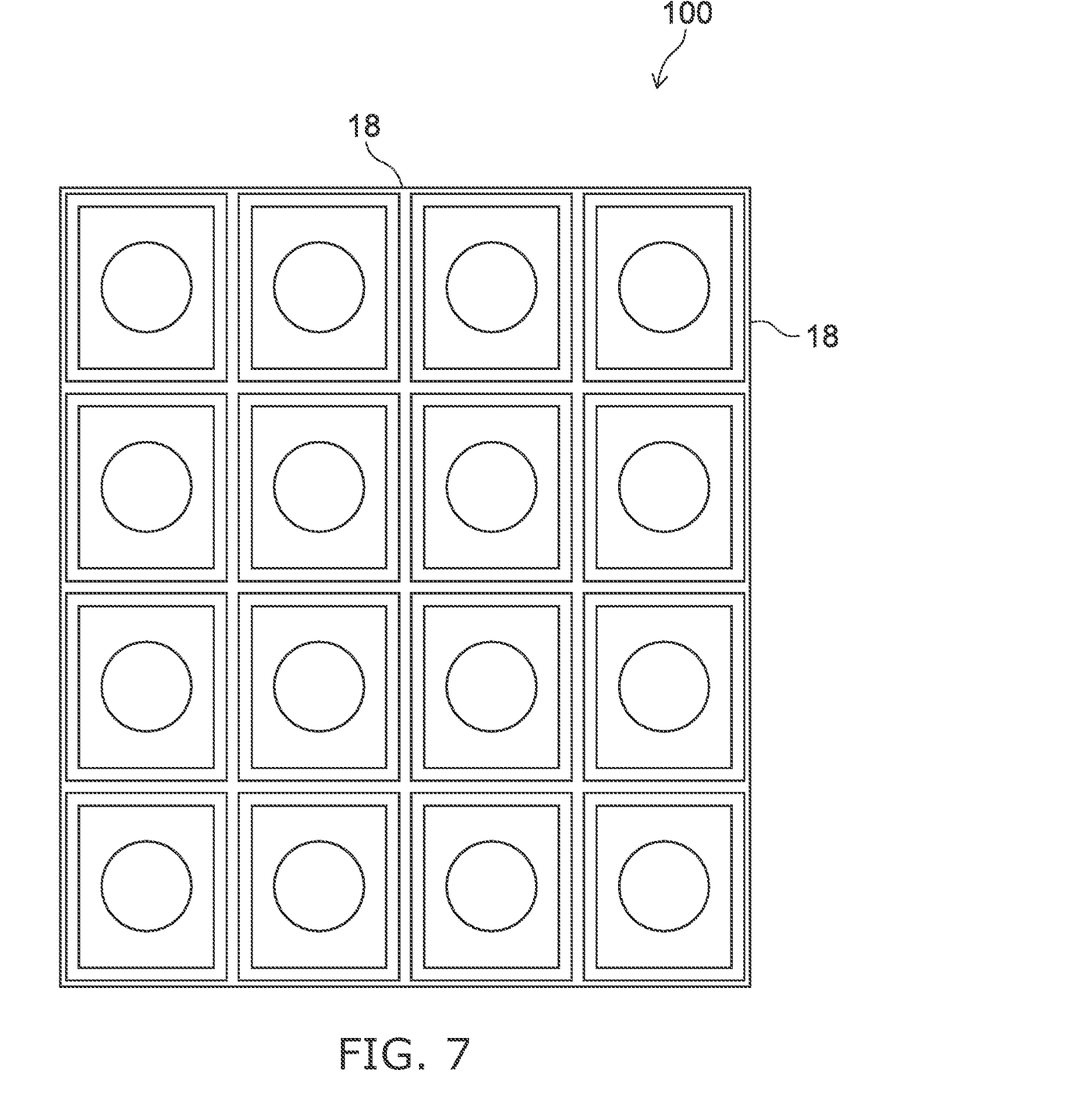
FIG. 7 is a schematic top view of a light emitting module according to another embodiment of the present invention.
Figure 8:
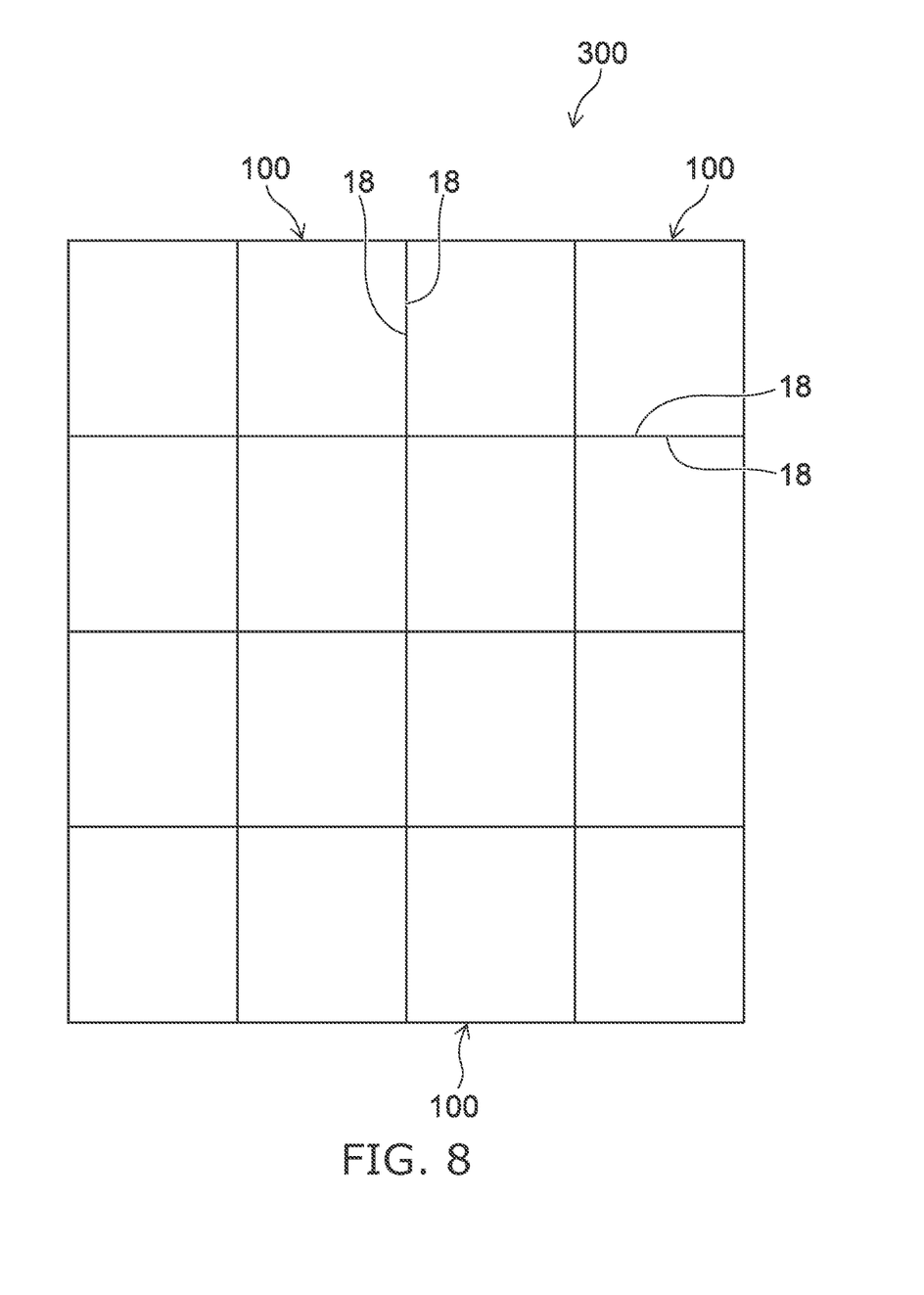
FIG. 8 is a schematic top view of a planar light source according to an embodiment of the present invention.

As shown in FIG. 7, the light emitting module 100 may have a structure in which a plurality of units, each including at least one light source 30, are repeated. A planar light source having a larger emission area may be constructed by combining the plurality of light emitting modules 100 described above. FIG. 8 is a schematic top view of such a planar light source 300.

A plurality of light emitting modules 100 are arranged in a matrix by joining adjacent outer lateral faces 18 of the light guides 10, for example. The light diffusion sheet 150 shown in FIG. 4 may be disposed so as to cover the wall portions 16 and the light transmitting parts 61 of the plurality of light emitting modules 100.

The outer lateral faces 18 of the wall portions 16 may be joined together along the boundaries between adjacent light emitting modules 100. Accordingly, the boundaries between adjacent light emitting modules 100 is less likely to become dark.

In the foregoing, certain embodiments of the present disclosure have been explained with reference to specific examples. The present disclosure, however, is not limited to these specific examples. All forms implementable by a person skilled in the art by suitably making design changes based on any of the embodiments disclosed above also fall within the scope of the present invention so long as they encompass the subject matter of the present disclosure. Furthermore, various modifications and alterations within the spirit of the present disclosure that could have been made by a person skilled in the art are also considered as those falling within the scope of the present disclosure.

What is claimed is:

1. A light emitting module comprising:
   a light guide having:
   an upper face having a projected portion that has a planar face, and a wall portion surrounding the projected portion, a top part of the wall portion being positioned higher than the planar face; and
   a lower face opposing the upper face, the lower face having a recessed portion,
   a light transmitting part formed on the projected portion in an area surrounded by the wall portion, and having a lower refractive index than a reflective index of the light guide, and
   a light source disposed in the recessed portion, wherein the projected portion has an oblique face oblique to the planar face, and disposed between the planar face and the wall portion, and
   in a plan view of the planar face of the projected portion, the oblique face of the projected portion is positioned outward of a lateral face of the recessed portion at least in part.

2. The light emitting module according to claim 1, further comprising a first light reflecting member disposed in the recessed portion between the planar face of the projected portion and the light source.

3. The light emitting module according to claim 2, wherein the light guide further includes a penetration part projecting from a bottom face of the recessed portion and penetrating the first light reflecting member.

4. The light emitting module according to claim 3, wherein the light guide further includes a second projected portion or a second recessed portion between the planar face of the projected portion and the oblique face of the light guide.

5. The light emitting module according to claim 1, wherein the light source includes a light emitting element and a phosphor layer disposed between a bottom face of the recessed portion and the light emitting element.

6. The light emitting module according to claim 1, wherein
   the light guide further has an oblique part oblique to and continuous with the lower face of the light guide and an outer lateral face of the wall portion of the light guide, and
   the light emitting module further includes a second light reflecting member covering the oblique part.

7. A planar light source, comprising
   the light emitting module according to claim 1, and
   a light diffusion sheet covering the wall portion and the light transmitting part of the light emitting module.

8. A planar light source, comprising the light emitting module according to claim 1 and at least one additional light emitting module arranged by joining an outer lateral face of the light guide of the light emitting module and an outer lateral face of a light guide of the additional light emitting module.

9. A planar light source, comprising:
   the light emitting module according to claim 1,
   at least one additional light emitting module arranged by joining an outer lateral face of the light guide of the light emitting module and an outer lateral face of a light guide of the additional light emitting module, and
   a light diffusion sheet covering the wall portion of the light emitting module, the light transmitting part of the light emitting module, a wall portion of the additional light emitting module, and a light transmitting part of the additional light emitting module.

* * * * *